United States Patent [19]

Stapleford

[11] 3,755,794

[45] Aug. 28, 1973

[54] MESSAGE GENERATOR

[75] Inventor: Gary N. Stapleford, Londonderry, N.H.

[73] Assignee: Comex Systems, Inc., Manchester, N.H.

[22] Filed: Feb. 25, 1972

[21] Appl. No.: 229,335

[52] U.S. Cl. .......................... 340/173 R, 340/172.5

[51] Int. Cl. .............................................. G11c 13/00

[58] Field of Search ...................... 340/173 R, 172.5

[56] References Cited

UNITED STATES PATENTS 2,787,418 4/1957 MacKnight ...................... 340/173 R 3,348,203 10/1967 Allen ............................ 340/173 R

*Primary Examiner*—Terrell W. Fears

*Attorney*—Robert R. Hubbard

[57] ABSTRACT

A message generator employing a read only memory to store segmental bit patterns of the message. A binary counter is employed to both address the memory as well as to control the conversion of the addressed message bit patterns from parallel to serial form.

7 Claims, 2 Drawing Figures

MESSAGE GENERATOR

BACKGROUND OF INVENTION

1. Field of Invention

This invention relates to digital signalling apparatus and in particular to a novel and improved message generator which can generate a message of any desired content in any desired code, such as Morse, ASCII, telephone dial pulses, and others.

Message generators embodying the present invention may be employed to generate either variable or fixed content messages. However, it is expected that the message generator of this invention will have greater utility in the fixed or "canned" message application. In the canned message application, the same message is required to be transmitted frequently over long periods of time. For example, canned messages can be used to transmit the identification or call letters of a radio station, a radio telephone and the like. Canned messages can also be employed to signal the status of mobile radio and telephone units. As another example, canned messages can also be employed to signal alarms from various points in an alarm system installation.

2. Prior Art

In the past, voice communication techniques have been used for many canned message applications. However, voice communication techniques now in use have resulted in frequency congestion of the radio frequency spectrum. As a result, alternative forms of communication techniques are under investigation which will enhance the speed of transmission and thereby more efficiently use the radio spectrum. One of the more promising of these alternative communication forms employs digital techniques.

In one prior art digital message generator, the message is stored in binary form by means of a plurality switches, there being one switch for each bit of the message. A read gate is provided for each memory switch. The read gates are sequentially sampled by a ring counter, the number of stages of which is equal to the number of gates. The problem with this approach is that there is a high component count due to the need for a gate and a ring counter stage for each bit storage location.

Other digital schemes have been designed to perform a specific type of code transmission, e.g., Morse or ASCII. Each such special purpose design is unique and cannot be easily modified to generate a message in an other code.

BRIEF SUMMARY OF INVENTION

An object of the present invention is to provide novel and improved message generator apparatus.

Another object is to provide a versatile message generator which can generate a message of any desired content and in any desired code by merely changing a stored program.

Still another object is to provide a novel and improved message generator which employs digital circuits.

Yet another object is to provide a novel and improved message generator which can generate messages at relatively high rates so as to efficiently use the radio spectrum.

In brief, message generator apparatus embodying the present invention employs a memory having a number of addressable storage locations. Segmental bit patterns of the message, e.g., one or more characters, are stored at different ones of the storage locations. Each stored bit pattern directly represents the desired message code such as Morse, ASCII, telephone dial pulses, and the like. A binary counter is employed to both address the storage locations and to control a multiplexer which multiplexes each addressed segmental bit pattern on to a single lead so as to form a serial bit pattern or pulse train in the desired transmission code. The least significant $k$ stages of the counter divide a count signal frequency so as to establish memory addressing intervals. The remainder of the counter stages represents an address field which changes in value once for each address interval. As the counter is advanced, the segmental bit patterns are addressed during successive address intervals.

During each address interval, a multiplexer responds to the least significant $k$ counter stages to convert the parallel segmental bit patterns to a serial bit or pulse train which is in the desired transmission code. The end of the message is represented by a unique bit pattern which, when addressed, causes the counter to be preset to an initial count state. The message content and/or transmission code can be changed by merely changing the program or bit patterns stored in the memory.

BRIEF DESCRIPTION OF THE DRAWING

In the accompanying drawing, like reference characters denote like components, and.

DESCRIPTION OF PREFERRED EMBODIMENT

Figures 1, 2:
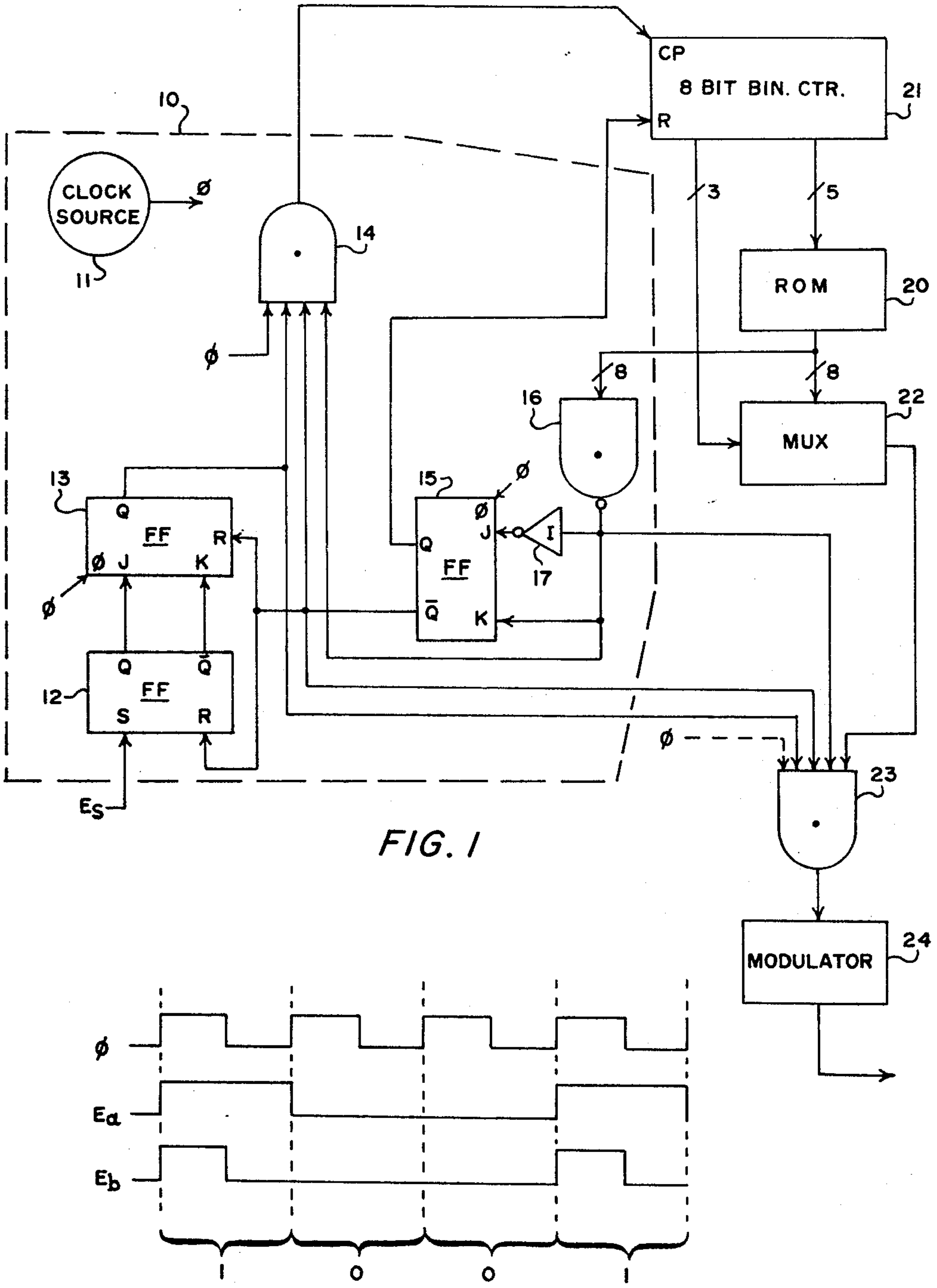
FIG. 1 is a block diagram, in part, and a logic schematic, in part, of a message generator embodying the present invention.
FIG. 2 is a waveform diagram showing the digital output of the message generator.

Message generator apparatus embodying the invention has been illustrated in the drawings with a number of blocks containing known circuits which are actuated by bi-level electrical signals applied thereto. When the signal is at one level, say the higher level, it represents the binary digit 1; and when it is at the other level, it represents the binary digit 0. Also, to simplify the discussion, rather than speaking of an electrical signal being applied to a block or logic stage, it is sometimes stated that a 1 or 0 is applied to the block stage.

The counter, flip-flop, multiplexer and logic gates or blocks shown in the drawing may take on any suitable form. For example, these circuits may be selected from either or both of the following catalogs: Fairchild, TTL Family, October,1970, a catalog of Fairchild Semiconductor, a division of Fairchild Camera & Instrument Corp.; or The Integrated Circuits Catalog for Design Engineers, a catalog of Texas Instruments, Inc. Coincidence gates are represented on the drawing with the conventional AND gate symbol having a dot therein. A small circle at the output of these gates represents a signal inversion such that an AND gate becomes a NAND gate. When a signal flow path contains more than a single lead or conductor, a slash mark is made through the path together with an adjacent number indicating the number of conductors in the path. One final note before preceeding with the description, the signal leads have in some cases been interrupted and labeled rather than shown as continuous leads so as to avoid cluttering of the drawing.

Referring now to FIG. 1, message generator apparatus embodying the present invention includes a memory 20 having a number of addressable storage locations. The message is partitioned into segmental bit patterns which are stored at different ones of the storage locations. Although the memory 20 may be a read and write memory for variable message content applications, it has been illustrated as a read only memory (ROM). One suitable memory which may be employed is a 32X8 bit, Model 8223, a product of Signetics Corporation of Sunnyvale, California. Using this memory as an example for the purpose of the present description, the ROM 20 has 32 addressable storage locations, each of which contains eight bits of storage. A segmental bit pattern stored at one of these locations represents a character, in whole or in part, or more than one character of the message and further directly represents the desired code, such as Morse, ASCII, telephone dial pulses, and the like. That is, the stored bit pattern directly represents the signal pattern of the desired code without the necessity for encoding devices.

A timing and control section 10 responds to an input signal $E_s$ to provide count signals to a binary counter 21 which begins to advance from an initial state. The binary counter 21 is employed to both address the ROM 20 and to control a multiplexer (MUX) 22 which multiplexes each addressed bit pattern on to a single lead so as to form a serial bit pattern signal having a bilevel waveform. The serial bilevel signal is applied via an AND gate 23 to a modulator 24 which converts the serial bilevel signal to a form more suitable for the transmission medium. For example, the modulator may employ any suitable type of modulation, such as amplitude, frequency, phase, and others.

The least significant $k$ stages ($k$=3 for the eight bit storage location length example) of counter 21 divide the count signal frequency so as to establish memory addressing intervals. The remainder of the counter stages (5 for the illustrated example of 32 storage locations) defines a memory address field. As the counter 21 is advanced by the count signals, the memory address field changes invalue once for each memory address interval. In other words, for each complete cycle of count states of the least significant $k$ stages, the memory addressing field changes in value such that different addresses are formed during consecutive address intervals.

Each addressed bit pattern is applied in parallel to a multiplexer 22 which serves to convert the parallel bit patterns to a serial bit pattern or signal train in response to the count states of the least significant $k$ counter stages. To this end, the output of each of the least significant $k$ stages of counter 21 is applied to the MUX 22. The MUX 22 responds to the received count states to sample the bit lead outputs of memory 20 in sequence during each address interval. The MUX output signal for each address interval will then be a single bilevel signal, with different ones of the levels representing the 0 and 1 values of the consecutively sampled bits read from memory 20.

The count signals supplied by timing and control section 10 are applied to the clock input CP of counter 21. The initial state of the counter for the illustrated embodiment is the reset state which is the all 0's state. Thus, as the counter 21 receives the first eight count signals after receipt of the input signal $E_s$, the first memory address will be 00000. As the counter continues to advance, all of the bit patterns which comprise the message are addressed during sequentially occuring address intervals. In the storage location following the last segment of the stored message, there is stored a stop code which for the illustrated example is all 1's.

The timing and control section 10 responds to this stop code to reset counter 21 to its initial all 0's state and to disable AND gate 23 from passing the bilevel serial bit signal from MUX 22 to modulator 24.

The timing and control section 10 includes a clock source 11 which provides a clock signal $\phi$. The clock source may take on any suitable form and preferably comprises a free running multivibrator of which both the period ( or frequency ) and the duty cycle ( or on/-off time ) are variable or selectable. This allows the data rate and the duty cycle of the message generator to be selected for each application by merely selecting the proper multivibrator time constant and on/off time.

The timing and control section 10 also includes flip-flops 12, 13 and 15 and gates 14, 16 and 17. The R-S flip-flop 12 receives the start signal $E_s$ at its set S input. For the illustrated embodiment, the start signal $E_s$ must have a pulse width which is less than the time required to generate the message. As such, the start signal $E_s$ may be derived from any suitable circuit ( not shown ) which can be either manually operated or automatically controlled.

Prior to the time that the start signal $E_s$ becomes a 1, the counter 21 is in its reset state so as to provide address 00000 to memory 20. The bit pattern stored at this location is the first segmental bit pattern of the message, which pattern will include at least one 0. As a result, NAND gate 16, which receives the addressed bits, will have a 1 at its output. Actually the output of NAND gate 16 will be a 0 only when the all 1's stop code is addressed from memory 20 and will be a 1 at all other times. The 1 output of gate 16 is applied to the K input of J-K flip-flop 15 and is inverted by inverter gate 17 so as to apply a 0 to the J input of flip-flop 15. As a result flip-flop 15 has a 1 and 0 at its Q and $\bar{Q}$ outputs at all times except for the time during which the stop code is being addressed from memory 20. The 1 output of gate 16 and the 1 at the $\bar{Q}$ output of flip-flop 15 will partially enable AND gates 14 and 23.

When the signal $E_s$ becomes a 1, flip-flop 12 becomes set such that its Q and $\bar{Q}$ outputs apply a 1 and 0 to the J and K inputs, respectively of J-K flip-flop 13. On the next ensuing clock pulse, J-K flip-flop 13 changes state such that its Q output applies a 1 to AND gate 14 and 23. Gate 14 will then be fully enabled to pass the clock signal $\phi$ to the CP input of counter 21. Gate 23 will also be fully enabled to pass the bilevel bit pattern signal from the MUX 22 to the modulator 24.

The counter 21 will then advance until all the message segments have been addressed and a stop code is encountered. When the stop code is encountered, the output of NAND gate 16 will become a 0 which will disable gate 23 and cause flip-flop 15 to change states on the next ensuing cycle of the clock signal $\phi$. This will (1) disable AND gate 14 from passing the clock signal $\phi$ to counter 21, (2) reset counter 21 to the all 0's state, (3) further disable gate 23 and (4) reset flip-flops 12 and 13. When flip-flop 13 has been reset, the O value of its Q output will then maintain AND gate 14 disabled. The bit pattern stored at the all 0's address will cause the output of NAND gate 16 to again become a 1. Flip-flop 15 will again change states when the clock signal $\phi$ again becomes a 1 so as to partially enable gates 14 and 23. The timing and control section 10 is now ready to receive another start signal $E_s$.

As described above, the message generator embodying the present invention responds to the start signal to provide a serial bilevel signal indicative of the message to the modualtor 24. Since the MUX 22 responds to successive count states on sequential clock cycles, the serial signal will be a 1 or a 0, as the case may be, for an entire clock cycle. This is shown in FIG. 2 where the waveform $E_a$ is the serial output signal of AND gate 23. For some applications it may be necessary to change this duty cycle so that the signal will assume a 1 value for only a portion of the clock period. This can be accomplished by gating the AND gate 23 with the clock signal $\phi$ as indicated in FIG. 2 by the dashed connection to gate 23. The effect of clocking the serial message signal with a 50 percent duty cycle clock is shown by the waveform $E_b$ in FIG. 2 for the same bit pattern as waveform $E_a$. As can be seen, the waveform $E_b$ assumes the 1 value for only one-half or 50 percent of the clock period. Accordingly, by changing the duty cycle of the clock signal $\phi$, the on or 1 time of the serial message signal can be selected. This is important for some applications, such as telephone dial codes and others.

There has been described message generator apparatus embodying the present invention. The nearly all digital circuit is attractive since advantage can be taken of integrated digital circuit technology. In addition, the message generator is extremely versatile since it can be used for any desired message content in any desired code by properly programming the memory 20 and selecting the clock frequency and duty cycle. It should be apparent that timing and control networks other than the illustrated one may be employed to respond to the start signal and to the message stop code to control counter 21 and MUX 22.

What is claimed is

1. A message generator comprising an addressable membory having a plurality of addressable storage locations, each containing a segmental bit pattern of a message;

a binary counter having a plurality of stages:

control means including means responsive to a start condition to apply count signals to said counter which begins counting from an initial state, the least significant $k$ stages of said counter dividing the count signal frequency so as to establish memory addressing intervals and the remainder of said counter stages including an address field which changes value once for each such interval;

means including said address field for addressing said memory locations so as to read said message segmental bit patterns during successive addressing intervals; and means including said least significant $k$ counter stages for multiplexing the bit pattern of each addressed message segment on to a single lead to form said message as a single serial bit pattern signal.

2. The invention as set forth in claim 1 wherein a unique bit pattern is stored in a location which is addressed after the location containing the last message segment; and wherein said control means further includes stop means responsive to the addressing of said unique bit pattern for resetting said counter to said initial state and for inhibiting said count signal applying means.

3. The invention as set forth in claim 2 wherein said control means further includes a source of clock signals;

wherein said count signal applying means includes a first gate which is enabled by the occurence of said start condition to pass said clock signals as said count signals to said counter and is disabled by said stop means.

4. The invention as set forth in claim 3 wherein said count signal applying means further includes a flip-flop circuit which responds to said start condition to enable said first gate and to said stop means to disable said first gate.

5. The invention as set forth in claim 4 and further including a second gate which receives at one input said serial bit signal and at another input said clock signals so as to provide a clocked serial bit signal.

6. The invention as set forth in claim 5 wherein said second gate also responds to said flip-flop circuit and to said stop means to become enabled and disabled at the same times as said first gate.

7. The invention as set forth in claim 6 wherein said control means further includes a source of clock signals; and further including a clock gate which gates said serial bit signal in response to said clock signals.

* * * * *